(12) United States Patent
Gehlhoff

(10) Patent No.: US 8,272,471 B2
(45) Date of Patent: Sep. 25, 2012

(54) ISOLATION VALVE FOR A LOAD-REACTION STEERING SYSTEM

(75) Inventor: Wade Leo Gehlhoff, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/093,670

(22) Filed: Apr. 25, 2011

(65) Prior Publication Data

US 2011/0197983 A1    Aug. 18, 2011

Related U.S. Application Data

(62) Division of application No. 12/114,061, filed on May 2, 2008, now Pat. No. 7,931,112.

(51) Int. Cl.
*B62D 5/06* (2006.01)

(52) U.S. Cl. ......... 180/417; 180/421; 180/441; 180/442

(58) Field of Classification Search .................. 180/417, 180/421, 441, 442
See application file for complete search history.

(56) References Cited

U.S. PATENT DOCUMENTS

| | | |
|---|---|---|
| 3,455,210 A | 7/1969 | Allen |
| 3,566,749 A | 3/1971 | Allen et al. |
| 3,801,239 A | 4/1974 | Larson |
| 3,819,307 A | 6/1974 | Uppal |
| 3,960,234 A | 6/1976 | Morgan |
| 4,077,484 A | 3/1978 | Dezelan |
| 4,096,883 A | 6/1978 | Yip |
| RE31,125 E | 1/1983 | Dwyer |
| 4,555,978 A | 12/1985 | Burandt et al. |
| 4,665,939 A | 5/1987 | Kreth et al. |
| 5,020,618 A | 6/1991 | Nagao |
| 5,267,628 A | 12/1993 | Tomiyoshi et al. |
| 5,303,636 A | 4/1994 | Stephenson et al. |
| 5,806,561 A | 9/1998 | Pedersen |
| 5,918,558 A | 7/1999 | Susag |
| 5,992,458 A | 11/1999 | Novacek et al. |
| 6,539,710 B2 | 4/2003 | Draper |
| 7,142,956 B2 | 11/2006 | Heiniger et al. |
| 7,185,730 B2 | 3/2007 | Schmidt et al. |
| 7,610,989 B2 | 11/2009 | Vigholm et al. |
| 7,980,354 B2 | 7/2011 | Thomsen et al. |
| 7,984,785 B2 | 7/2011 | Cadman et al. |
| 2005/0205337 A1 | 9/2005 | Porskrog et al. |
| 2006/0248883 A1 | 11/2006 | Gehlhoff |

FOREIGN PATENT DOCUMENTS

| | | |
|---|---|---|
| EP | 1 020 343 | 7/2000 |
| EP | 1 295 778 | 3/2003 |
| GB | 2 341 159 | 3/2000 |

OTHER PUBLICATIONS

PTS9-8, Pilot to Shift Valve, Eaton Vickers Screw-In Cartridge Valves; V-VLOV-MC001-E4, Sep. 2007, 2 pages.
File history of U.S. Appl. No. 12/039,599.
International Search Report and Written Opinion from International Application No. PCT/IB2009/000338, mailed Jun. 12, 2009.
Sauer Danfoss, OSPE Steering Valve SASA Sensor, Technical Information, Jul. 2011, 48 pages.

*Primary Examiner* — Lesley D. Morris
*Assistant Examiner* — Michael Stabley
(74) *Attorney, Agent, or Firm* — Merchant & Gould P.C.

(57) ABSTRACT

A steering system includes a fluid actuator, a first steering circuit in selective fluid communication with the fluid actuator, and a second steering circuit in selective fluid communication with the fluid actuator and disposed in parallel to the first steering circuit. The second steering circuit includes a load-reaction feature and an isolation valve with the isolation valve being adapted to enable and disable the load-reaction feature.

5 Claims, 7 Drawing Sheets

ISOLATION VALVE FOR A LOAD-REACTION STEERING SYSTEM

BACKGROUND

In many "off-highway" vehicles, such as line painting vehicles, sweepers, pavers, marine vehicles, etc., parallel steering circuits are used to control an actuator that steers the vehicle. In some applications, each of the parallel steering circuits is actuated using a steering wheel. In other applications, only one of the steering circuits is actuated using the steering wheel.

In addition, many vehicle manufacturers prefer to use steering circuits that incorporate a "load-reaction" feature. The "load-reaction" feature is one in which external loads imparted onto the actuator will be felt by the vehicle operator through the steering wheel.

While vehicle manufacturers prefer to use the "load-reaction" feature with steering circuits, this feature is not used with parallel steering circuits since the actuation of one of the steering circuits will result in movement of the steering wheel of the other steering circuit. Therefore, there exists a need for a parallel steering circuit having a load-reaction feature that overcomes the above disadvantages.

SUMMARY

An aspect of the present disclosure relates to a steering system having a fluid actuator, a first steering circuit in selective fluid communication with the fluid actuator, and a second steering circuit in selective fluid communication with the fluid actuator and disposed in parallel to the first steering circuit. The second steering circuit includes a load-reaction feature and an isolation valve that is adapted to enable and disable the load-reaction feature.

Another aspect of the present disclosure relates to a steering system having a first steering circuit in selective fluid communication with a fluid actuator. The first steering circuit defines a first flow path and includes a first proportional valve disposed in the first flow path. The steering system further includes a second steering circuit in selective fluid communication with the fluid actuator. The second steering circuit defines a second flow path that is in a parallel flow configuration with the first flow path of the first steering circuit. The second steering circuit includes a second proportional valve and an isolation valve. The second proportional valve includes a neutral position that is adapted to transmit a reaction load to a steering actuator in response to an external load applied to the fluid actuator. The isolation valve is disposed in the second flow path between the second proportional valve and the fluid actuator. The isolation valve is adapted to disable the transmission of the reaction load when the first proportional valve is in fluid communication with the fluid actuator and enable the transmission of the reaction load when the second proportional valve is in fluid communication with the fluid actuator.

Another aspect of the present disclosure relates to a method for enabling a load-reaction feature of a steering system. The method includes providing a first steering circuit in selective fluid communication with a fluid actuator. A second steering circuit in selective fluid communication with the fluid actuator is provided. The second steering circuit is in parallel to the first steering circuit. The second steering circuit includes a proportional valve having a load-reaction feature. An isolation valve is provided between the proportional valve of the second steering circuit and the fluid actuator. The isolation valve is actuatable between a first position and a second position where the first position enables the load-reaction feature of the proportional valve and the second position disables the load-reaction feature. The isolation valve is piloted to the first position with fluid communicated from the second steering circuit.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
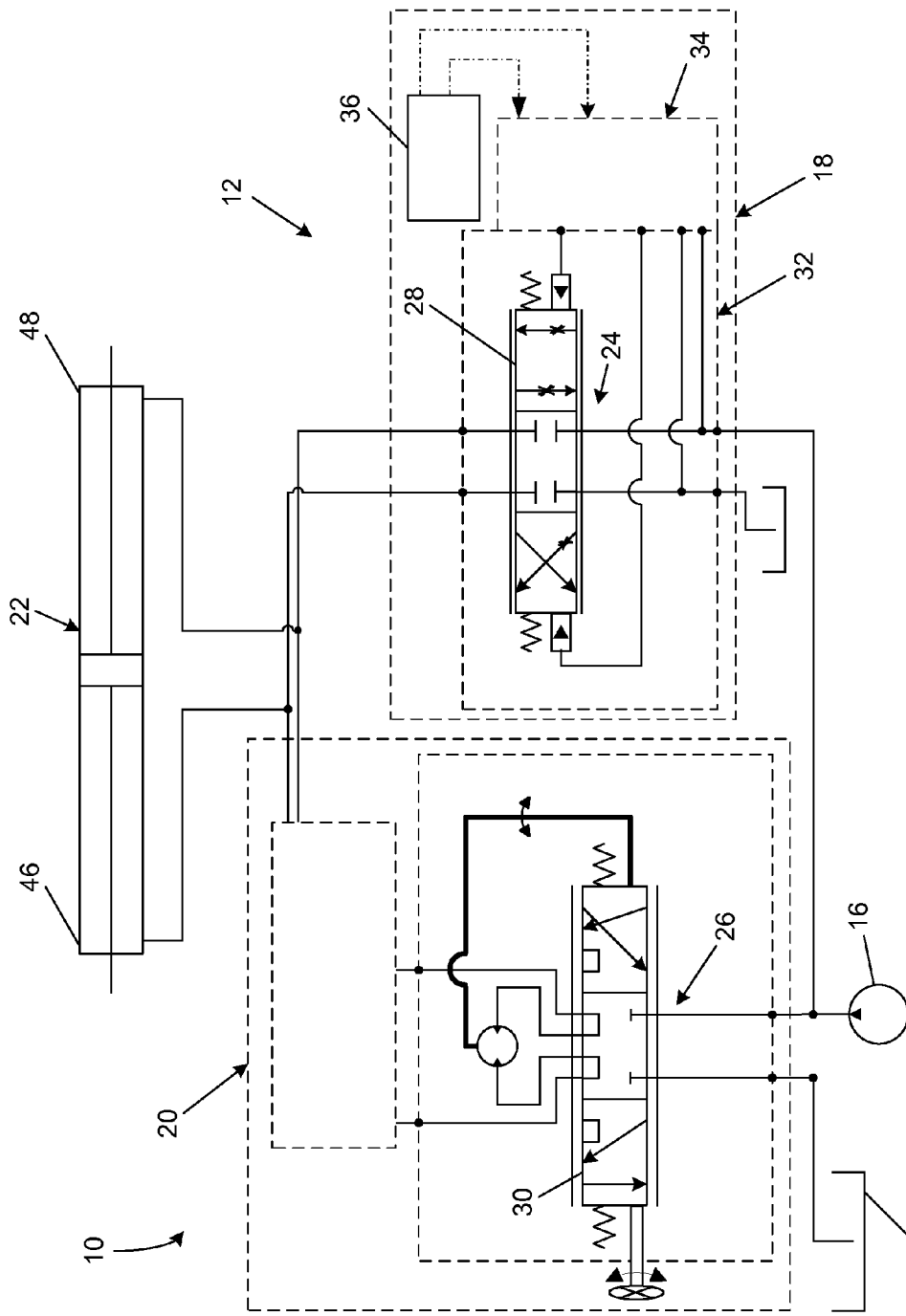
FIG. 1 is a hydraulic schematic of a steering system having features that are examples of aspects in accordance with the principles of the present disclosure.

Referring now to FIG. 1, a hydraulic schematic of a steering system, generally designated 10, for an off-highway vehicle (e.g., combine, tractor, paver, line painter, sweeper, marine vehicle, etc.) is shown. The steering system 10 includes a steering circuit, generally designated 12, having a reservoir 14 and a pump 16, shown herein as a pressure compensated pump, where the pump 16 has an inlet in fluid communication with the reservoir 14.

The steering circuit 12 further includes an electro-hydraulic steering circuit, generally designated 18, and a hydrostatic steering circuit, generally designated 20. Each of the electro-hydraulic steering circuit 18 and the hydrostatic steering circuit 20 provide selective fluid communication between the pump 16 and a fluid actuator 22. While the fluid actuator 22 is shown in FIG. 1 as being a single fluid actuator, it will be understood that the term "fluid actuator" in the specification and the claims includes at least one fluid actuator.

The electro-hydraulic steering circuit 18 defines a first flow path 24 while the hydrostatic steering circuit 20 defines a second flow path 26. The first flow path 24 of the electro-hydraulic steering circuit 18 is disposed in a parallel flow configuration with the second flow path 26 of the hydrostatic steering circuit 20. In the subject embodiment, the electro-hydraulic steering circuit 18 includes a first proportional valve 28 for selectively communicating fluid from the pump 16 to the fluid actuator 22 through the first flow path 24 while the second flow path 26 includes a second proportional valve 30 for selectively communicating fluid from the pump 16 to the fluid actuator 22 through the second flow path 26.

Figure 2:
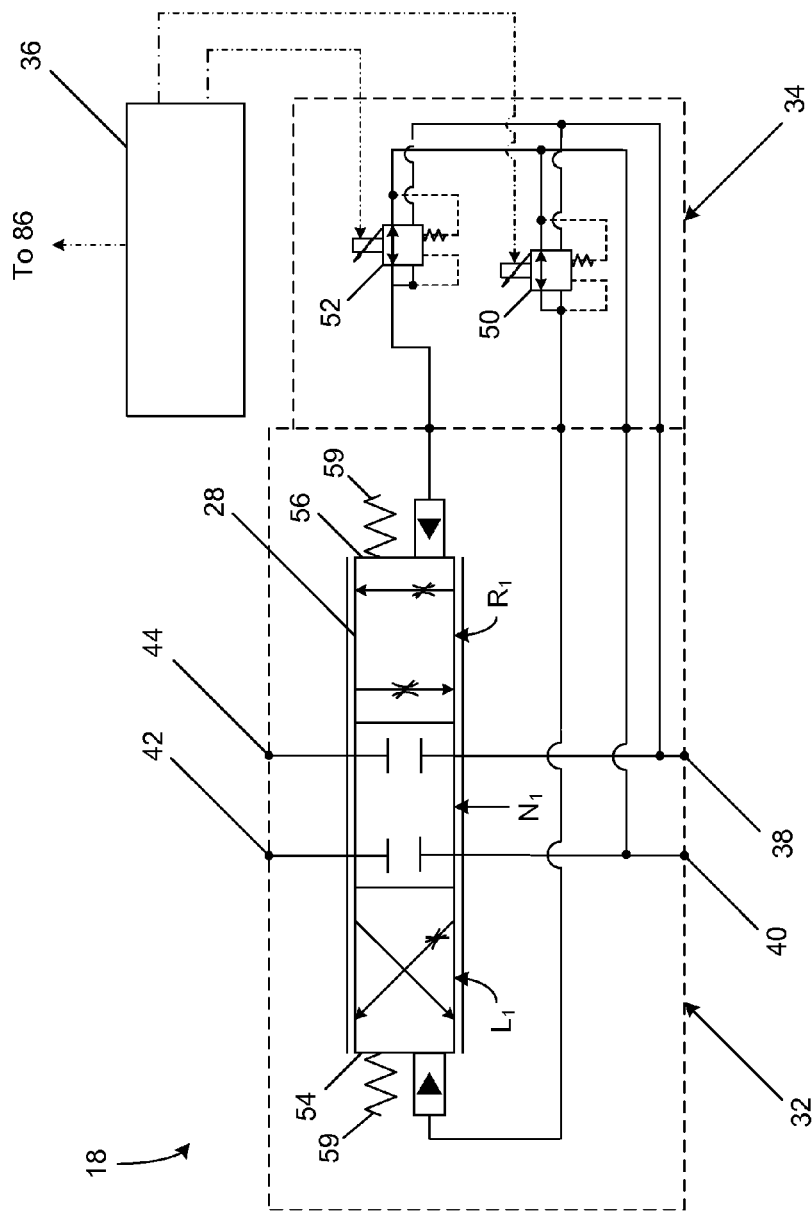
FIG. 2 is a hydraulic schematic of an electro-hydraulic steering circuit suitable for use with the steering system of FIG. 1.

Referring now to FIGS. 1 and 2, the electro-hydraulic steering circuit 18 is shown. The electro-hydraulic steering circuit 18 includes a control valve assembly, generally designated 32, a pilot valve assembly, generally designated 34, and a microcontroller 36.

In the subject embodiment, the control valve assembly 32 defines an inlet 38 in fluid communication with the pump 16, an outlet 40 in fluid communication with the reservoir 14, a first actuator outlet 42 and a second actuator outlet 44. The first and second actuator outlets 42, 44 are in fluid communication with a first end 46 (shown in FIG. 1) and an oppositely disposed second end 48 (shown in FIG. 1), respectively, of the fluid actuator 22.

The control valve assembly 32 defines the first flow path 24 from the inlet 38 to the first and second actuator outlets 42, 44. The first proportional valve 28 is disposed in the first flow path 24 between the inlet 38 and the first and second actuator outlets 42, 44. In the subject embodiment, and by way of example only, the first proportional valve 28 is a three-position, four-way valve. The first proportional valve 28 includes a neutral position $N_1$, a right turn position $R_1$, and a left turn position $L_1$. In the subject embodiment, the neutral position $N_1$ is a closed position. It will be understood that the term "closed position" refers to a position in which fluid communication between the inlet 38 and one of the first and second actuator outlets 42, 44 is blocked. In other words, with the first proportional valve 28 in the neutral position $N_1$, fluid from the pump 16 cannot be communicated through the first flow path 24 to the fluid actuator 22 via the first and second actuator outlets 42, 44. The term "closed position" does not refer, however, to fluid communication between the inlet 38 and the outlet 40 as the inlet 38 and the outlet 40 may be in fluid communication in the neutral position $N_1$.

In the subject embodiment, the first proportional valve 28 is a pilot operated valve. To actuate the first proportional valve 28, pilot pressure is supplied by a first and second pilot valve 50, 52 of the pilot valve assembly 34 to a first and second end 54, 56, respectively, of the first proportional valve 28. In the subject embodiment, the first and second pilot valves 50, 52 are in selective fluid communication with the pump 16 and the reservoir 14. In one embodiment, the pressure of the fluid from the pump 16 is reduced such that full system pressure is not communicated to the first and second ends 54, 56 of the first proportional valve 28.

If pressurized fluid is supplied to the first end 54 of the first proportional valve 28, the first proportional valve 28 is actuated to the left turn position $L_1$. If pressurized fluid is supplied to the second end 56 of the first proportional valve 28, the first proportional valve 28 is actuated to the right turn position $R_1$. When the pilot pressure is drained from the first and second ends 54, 56 of the first proportional valve 28 to the reservoir 14, centering springs 59 disposed at the first and second ends 54, 56 position the first proportional valve 28 in the neutral position $N_1$.

In the subject embodiment, the first and second pilot valves 50, 52 are solenoid valves that are actuated in response to signals sent from the microcontroller 36. In one aspect of the present disclosure, the microcontroller 36 receives information from a Global Positioning System (GPS) receiver related to the location, direction, and speed of the vehicle. The microcontroller 36 then transmits signals to the first and second pilot valves 50, 52 in order to control the position of the first proportional valve 28.

Figure 3:
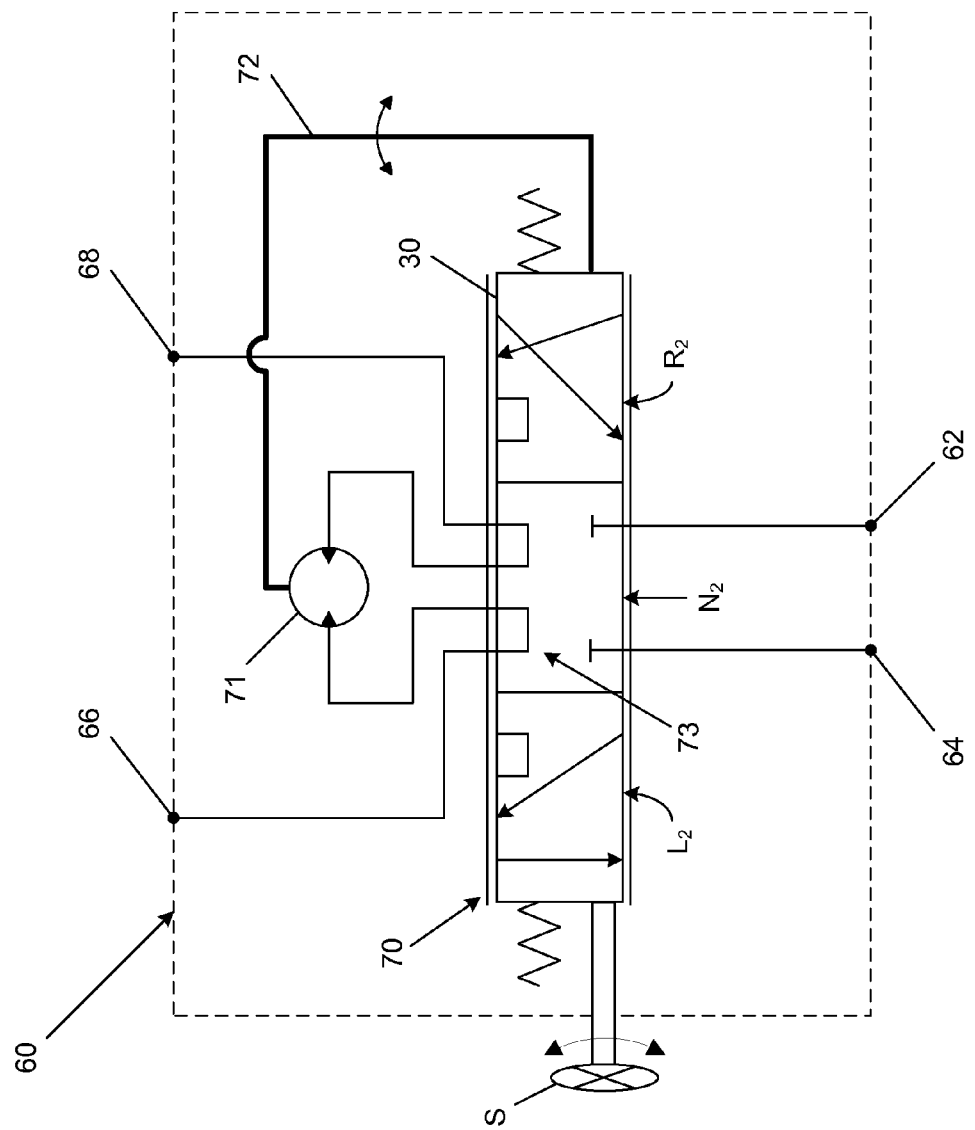
FIG. 3 is a hydraulic schematic of a fluid controller suitable for use with the steering system of FIG. 1.

Referring now to FIG. 3, a fluid controller, generally designated 60, of the hydrostatic steering circuit 20 is shown. The fluid controller 60 includes the second proportional valve 30 and defines a fluid inlet port 62 in fluid communication with the pump 16, a fluid outlet port 64 in fluid communication with the reservoir 14, a first control port 66, and a second control port 68. The first and second control ports 66, 68 are in fluid communication with the first and second ends 46, 48, respectively, of the fluid actuator 22 (shown in FIG. 1). The second proportional valve 30 is disposed between the fluid inlet port 62 and the first and second control ports 66, 68.

In the subject embodiment, the second proportional valve 30 includes a valving assembly 70 having a rotary valve (e.g., spool) and a follow-up valve member (e.g., sleeve). In the subject embodiment, the spool rotates within a bore of the sleeve as a result of manual actuation of a steering actuation member S (e.g., a steering wheel, a joystick, etc.).

The second proportional valve 30 is movable from a neutral position $N_2$ to a right turn position $R_2$ or a left turn position $L_2$ through the manual actuation of the steering actuation member S. With the second proportional valve 30 in the right turn position $R_2$ or the left turn position $L_2$, fluid is communicated from the pump 16 to one of the first and second ends 46, 48 of the fluid actuator 22 through a fluid meter 71 (e.g., a gerotor gear set).

In the subject embodiment, the fluid meter 71 is dual functional. The fluid meter 71 functions as a metering device that measures the proper amount of fluid to be fed to the appropriate control port 66, 68 of the fluid controller 60 in response to rotation of the steering actuation member S. The fluid meter 71 also functions as a follow-up device that provides follow-up movement to the valving assembly 70 such that the valving assembly 70 is returned to the neutral position $N_2$ after the desired amount of fluid has been directed through the fluid meter 71 to the fluid actuator 22. In the subject embodiment, this follow-up movement is achieved by a mechanical link 72 (e.g., a drive, etc.) that connects the fluid meter 71 to the valving assembly 70.

The fluid controller 60 includes a load-reaction feature 73. An exemplary fluid controller having a load-reaction feature has been described in U.S. Pat. No. 5,992,458, which is hereby incorporated by reference in its entirety. It will be understood that the term "load-reaction feature" as used in the specification and the claims of the present disclosure is defined as a feature in which the first and second control ports 66, 68 of the fluid controller 60 are in fluid communication with the opposite sides of the fluid meter 71 when the second proportion valve 30 is in the neutral position $N_2$.

With the first and second control ports 66, 68 in fluid communication with the fluid meter 71 when the fluid controller 60 is in the neutral position $N_2$, any external load imposed on the fluid actuator 22 will impart a reaction load on the fluid meter 71. As the fluid meter 71 is mechanical connected to the valving assembly 70 through the mechanical link 72 and as the valving assembly 70 is mechanically connected to the steering actuation member S, this reaction load imposed on the fluid meter 71 will be felt by the vehicle operator through the steering actuation member S.

Figure 4:
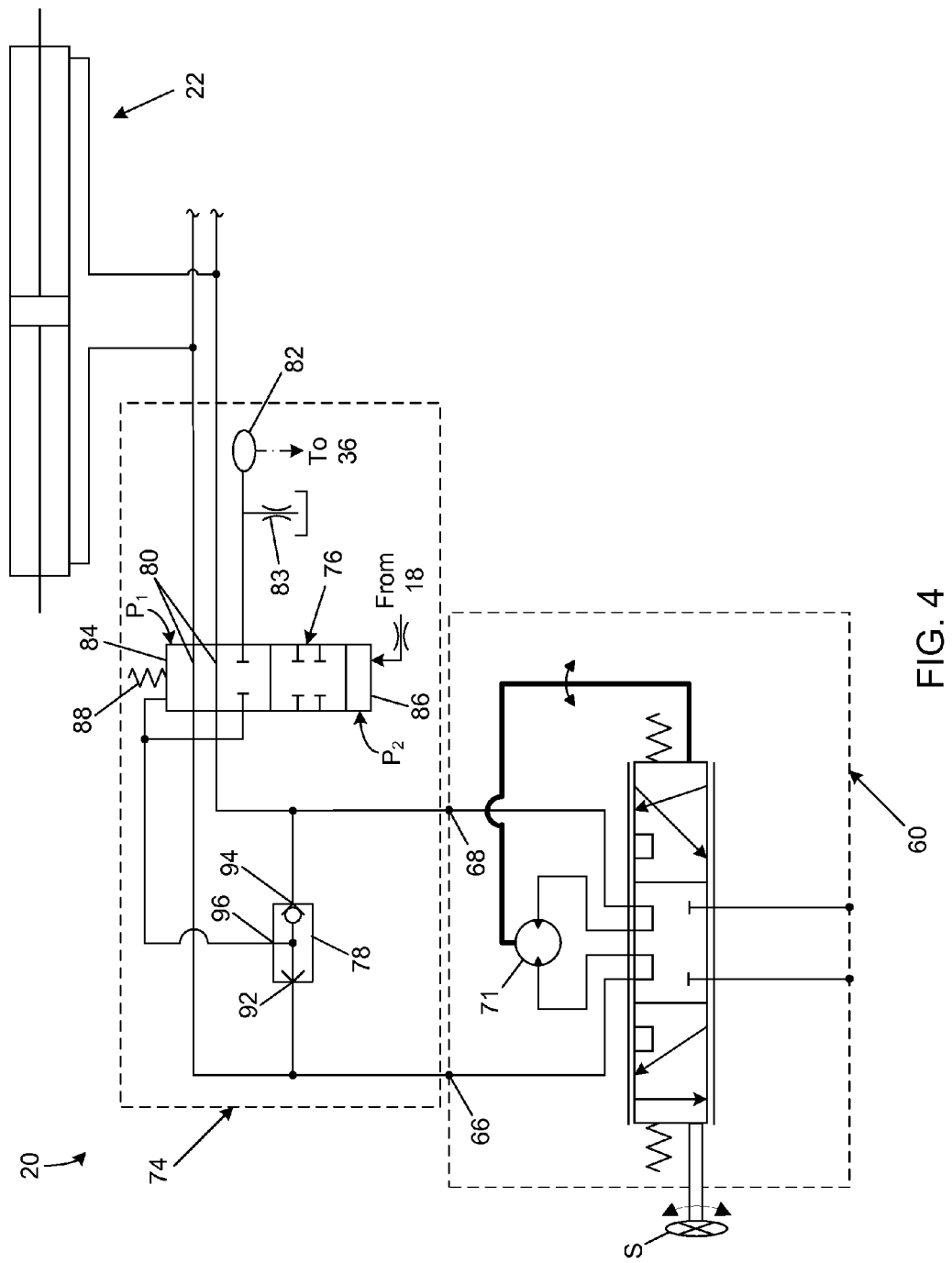
FIG. 4 is a hydraulic schematic of a hydrostatic steering circuit having the fluid controller in fluid communication with an isolation valve.

Referring now to FIG. 4, the isolation valve circuit, generally designated 74, of the hydrostatic steering circuit 20 is shown. The isolation valve circuit 74 is disposed in the second flow path 26 of the hydrostatic steering circuit 20 such that the isolation valve circuit 74 is in a series flow configuration with the fluid controller 60 of the hydrostatic steering circuit 20. In the subject embodiment, the isolation valve circuit 74 is disposed between the fluid controller 60 and the fluid actuator 22. In the subject embodiment, the isolation valve circuit 74 includes an isolation valve, generally designated 76, and a shuttle valve 78.

In the depicted embodiment of FIG. 4, the isolation valve 76 is a two-position, six-way valve having a first position $P_1$ and a second position $P_2$. In the first position $P_1$ (shown in FIG. 4), the isolation valve 76 enables the load-reaction feature 73 of the hydrostatic steering circuit 20 by allowing fluid to flow from the fluid actuator 22 through a fluid pathway 80 to the second proportional valve 30. With the isolation valve 76 in this first position $P_1$ and with the second proportional valve 30 in the neutral position $N_2$, an external load acting on the fluid actuator 22 will result in fluid flowing from the fluid actuator 22 through the second proportional valve 30 to the fluid meter 71. As the fluid meter 71 rotates in response to the fluid flowing from the fluid actuator 22 due to the external load, the fluid meter 71 rotates the mechanical link 72. The rotation of the mechanical link 72 causes the valving assembly 70 to rotate, which in turn rotates the steering actuation member S. With the second proportional valve 30 in the neutral position $N_2$ and the isolation valve 76 in the first position $P_1$, the movement of the steering actuation member S in response to an external load applied to the fluid actuator 22 alerts the operator that a steering correction may be necessary to reduce or eliminate the external load acting on the fluid actuator 22. In addition, with the isolation valve 76 in this first position $P_1$, manual actuation of the steering actuation member S to the left or right turn position $L_2$, $R_2$ will result in a measured amount of fluid flowing through the fluid meter 71 to the fluid actuator 22.

With the isolation valve 76 in the second position $P_2$, the load-reaction feature 73 of the hydrostatic steering circuit 20 is disabled by blocking the fluid pathway 80 between the fluid controller 60 and the fluid actuator 22. This selective disablement of the load-reaction feature 73 of the hydrostatic steering circuit 20 allows for another steering circuit disposed in a parallel flow configuration to control the fluid actuator 22 without imparting movement to the steering actuation member S of the hydrostatic steering circuit 20. For example, in the subject embodiment, with the second proportional valve 30 in the neutral position $N_2$ and the isolation valve 76 in the second position $P_2$, actuation of the fluid actuator 22 by the first proportional valve 28 of the electro-hydraulic steering circuit 18 does not result in movement of the steering actuation member S of the hydrostatic steering circuit 20.

In the depicted embodiment of FIG. 4, the second position $P_2$ provides a fluid communication between the first and second control ports 66, 68 of the fluid controller 60 and a sensor 82. In one embodiment, the sensor 82 is a pressure sensor. The sensor 82 is in electrical communication with the microcontroller 36 of the electro-hydraulic steering circuit 18. If the steering actuation member S is actuated with the isolation valve 76 in the second position $P_2$, fluid passing though one of the first and second control ports 66, 68 is initially in communication with the sensor 82. In response, the sensor 82 sends a signal to the microcontroller 36 indicating that the steering actuation member S is being actuated. If the first proportional valve 28 is in one of the left and right turn positions $L_1$, $R_1$, the microcontroller 36 transmits signals to the first and second pilot valves 50, 52 in order to return the first proportional valve 28 to the neutral position $N_1$.

In the subject embodiment, a leakage orifice 83 is disposed between the sensor 82 and the isolation valve 76. The leakage orifice 83 is drained to the reservoir 14 and reduces the risk of the sensor 82 falsely transmitting a signal to the microcontroller 36 as a result of leakage of the isolation valve 76. In addition, if both the first and second control ports 66, 68 were blocked, the fluid meter 71 would be hydraulically locked and prevented from rotating. In the subject embodiment, the inclusion of the leakage orifice 83 relieves this hydraulic lock condition of the fluid meter 71 allowing the steering actuation device S to be manually rotated with the isolation valve 76 in the second position $P_2$.

The actuation of the isolation valve 76 will now be described. The isolation valve 76 of the isolation valve circuit 74 includes a first end 84 and an oppositely disposed second end 86. In the subject embodiment, the first end 84 is piloted by the hydrostatic steering circuit 20 while the second end 86 is piloted by the electro-hydraulic steering circuit 18.

The isolation valve 76 is biased into the first position $P_1$ so that the load-reaction feature 73 of the hydrostatic steering circuit 20 is biased to the enabled condition. In the subject embodiment, a spring 88 biases the isolation valve 76 to the first position $P_1$ when neither the first end 84 nor the second end 86 are piloted.

In the subject embodiment, the isolation valve circuit 74 includes the shuttle valve 78. The shuttle valve 78 includes a first inlet 92 and a second inlet 94. In the subject embodiment, the first inlet 92 is in fluid communication with the first control port 66 while the second inlet 94 is in fluid communication with the second control port 68. The shuttle valve 78 further includes a fluid outlet 96, which is in fluid communication with the first end 84 of the isolation valve 76.

In operation, when the steering actuation member S is actuated, fluid is ported to one of the first and second control ports 66, 68 through the second proportional valve 30. A portion of this fluid enters one of the first inlet 92 and the second inlet 94 of the shuttle valve 78. The pressure of the fluid causes a check within the shuttle valve 78 to block the other inlet to the shuttle valve 78. The fluid then passes through the fluid outlet 96 to the first end 84 of the isolation valve 76. The pressure of the fluid acting on the first end 84 of the isolation valve 76 creates a first force that actuates the isolation valve 76 into the first position $P_1$, in which the fluid pathway 80 is open between the fluid controller 60 and the fluid actuator 22.

In one embodiment, when the first proportional valve 28 of the electro-hydraulic steering circuit 18 is actuated, fluid is communicated from the electro-hydraulic steering circuit 18 to the second end 86 of the isolation valve 76. The pressure of the fluid from the electro-hydraulic steering circuit 18 acting on the second end 86 of the isolation valve 76 creates a second force that actuates the isolation valve 76 into the second position $P_2$ when the second proportional valve 30 is in the neutral position $N_2$.

In another embodiment, the second end 86 of the isolation valve 76 is actuated by a solenoid. When the first proportional valve 28 of the electro-hydraulic steering circuit 18 is actuated, an electrical signal from the microcontroller 36 of the electro-hydraulic steering circuit 18 is communicated to the second end 86 of the isolation valve 76 to actuate the isolation valve 76 into the second position $P_2$ when the second proportional valve 30 is in the neutral position $N_2$.

In another embodiment, when the first proportional valve 28 of the electro-hydraulic steering circuit 18 is actuated, an electrical signal from the microcontroller 36 of the electro-hydraulic steering circuit 18 is communicated to a third pilot valve in the pilot valve assembly 34. When actuated, the third pilot valve communicates fluid to the second end 86 of the isolation valve 76 to actuate the isolation valve 76 into the second position $P_2$ when the second proportional valve 30 is in the neutral position $N_2$.

In this second position $P_2$, the fluid pathway 80 between the fluid controller 60 of the hydrostatic steering circuit 20 and the fluid actuator 22 is blocked and the fluid actuator 22 is actuated by fluid from the electro-hydraulic steering circuit 18. With the fluid pathway 80 between the fluid controller 60 of the hydrostatic steering circuit 20 and the fluid actuator 22 blocked, the actuation of the fluid actuator 22 by the electro-hydraulic steering circuit 18 does not impart movement on the steering actuation member S of the hydrostatic steering circuit 20.

In one embodiment, the first force is greater than the second force acting on the second end 86 of the isolation valve 76. In the subject embodiment, the increased magnitude of the first force as compared to the second force is due to the fluid from the fluid outlet 96 of the shuttle valve 78 and the spring acting on the first end 84 of the isolation valve 76. In another embodiment, the pressure of the fluid from the electro-hydraulic steering circuit 18 acting on the second end 86 may be reduced through a pressure reducing valve in series with the electro-hydraulic steering circuit 18. The first force being greater than the second force may be advantageous in steering systems that require the hydrostatic steering circuit 20 to override the electro-hydraulic steering circuit 18.

Figure 5:
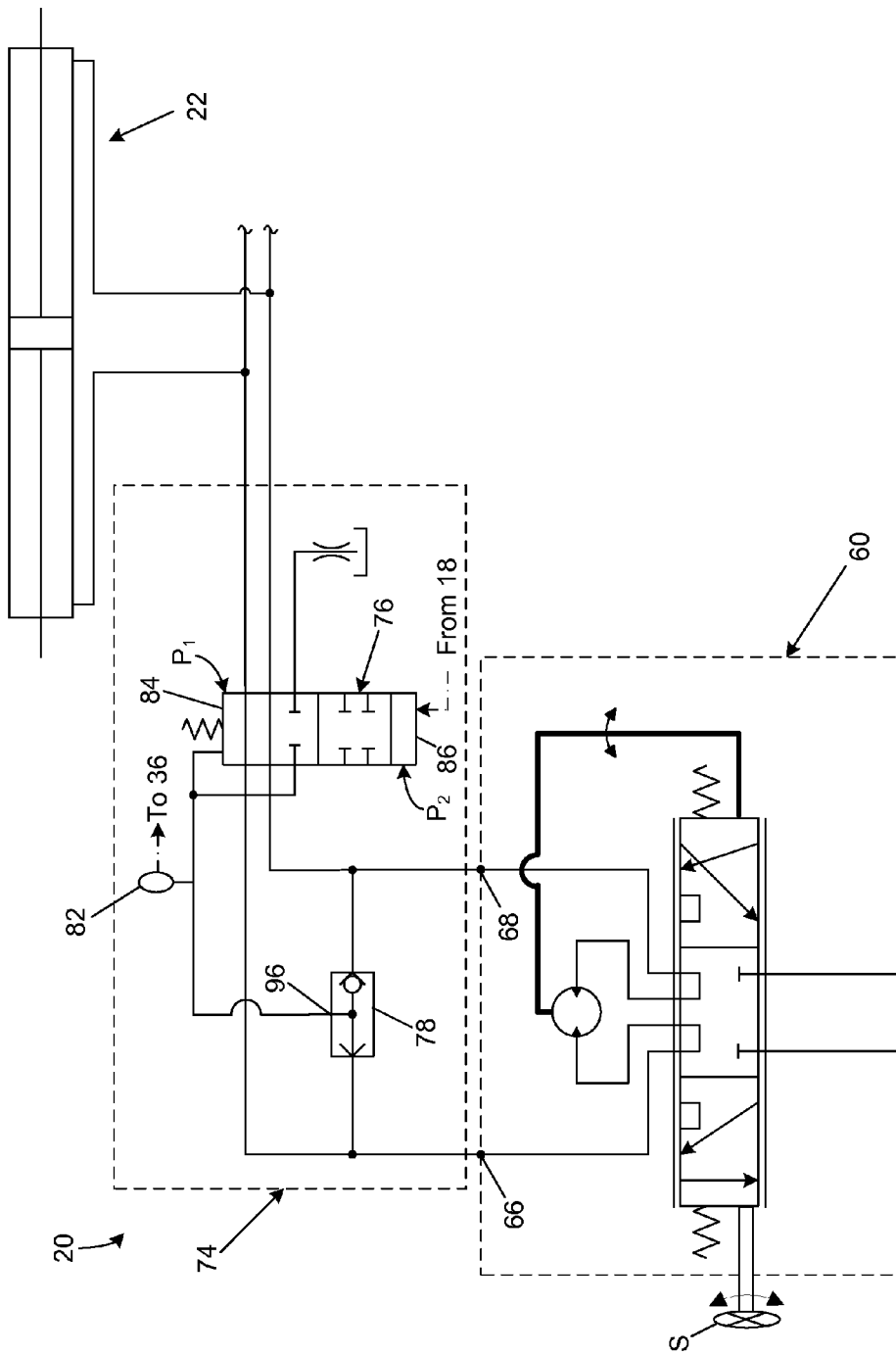
FIG. 5 is a hydraulic schematic of a hydrostatic steering circuit having the fluid controller in fluid communication with an alternate embodiment of an isolation valve.

Referring now to FIG. 5, the hydrostatic steering circuit 20 is shown with an alternate location for the sensor 82. In the subject embodiment, the sensor 82 is disposed between the fluid outlet 96 of the shuttle valve 78 and the first end 84 of the isolation valve 76. As the sensor 82 is in electrical communication with the microcontroller 36 of the electro-hydraulic steering circuit 18, when the steering actuation member S of the hydrostatic steering circuit 20 is actuated, fluid from one of the first and second control ports 66, 68 is communicated through the shuttle valve 78 to the first end 84 of the isolation valve 76. The sensor 82 detects this fluid communication and electrically communicates a signal to the microcontroller 36 of the electro-hydraulic steering circuit 18 that indicates the steering actuation member S is being actuated.

Figure 6:
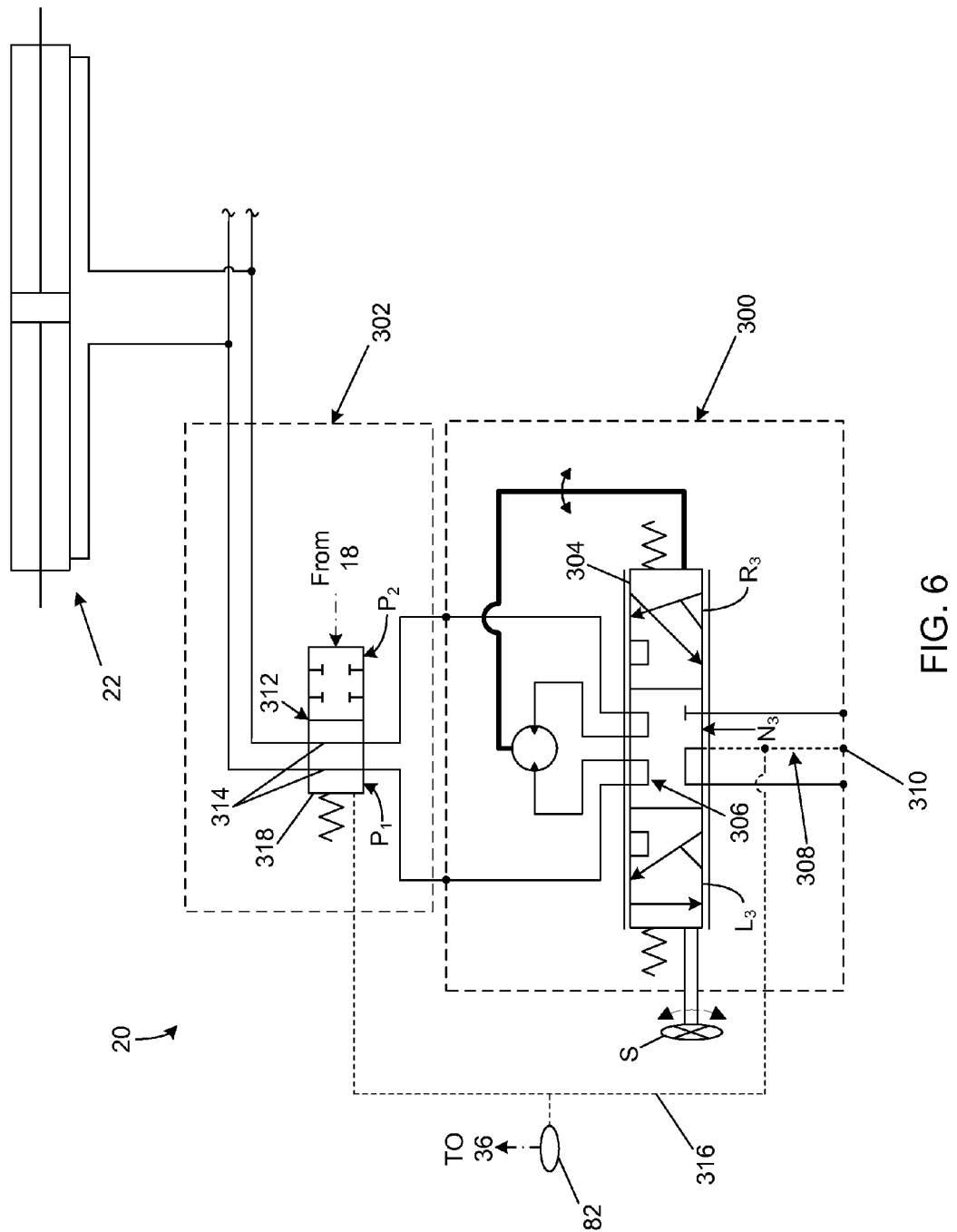
FIG. 6 is a hydraulic schematic of a hydrostatic steering circuit having an alternate embodiment of a fluid controller in fluid communication the isolation valve of FIG. 5.

Referring now to FIG. 6, an alternate embodiment of a fluid controller 300 of the hydrostatic steering circuit 20 is shown in series with an alternate embodiment of an isolation circuit, generally designated 302. The fluid controller 300 includes a second proportional valve 304. The second proportional valve 304 is movable from a neutral position $N_3$ to a right turn position $R_3$ or a left turn position $L_3$ through the manual actuation of the steering actuation member S. In the subject embodiment, the second proportional valve 304 includes a load-reaction feature 306 and a load-sensing feature 308.

In the depicted embodiment of FIG. 6, the load-sensing feature 308 includes an auxiliary fluid port 310 that is in selective fluid communication with the pump 16 when the second proportional valve 304 is actuated to one of the right and left turn positions $R_3$, $L_3$. In one embodiment, the auxiliary fluid port 310 is in selective fluid communication with a load-sense priority valve that apportions the flow of fluid from the pump 16 between the steering circuit 12 and an auxiliary circuit. An exemplary load-sense priority valve suitable for use with the steering circuit 12 is provided in U.S. Pat. No. 3,455,210, which is hereby incorporated by reference in its entirety.

The isolation circuit 302 is in a series flow configuration with the fluid controller 60 of the hydrostatic steering circuit 20 and is disposed between the fluid controller 60 and the fluid actuator 22. In the subject embodiment, the isolation circuit 302 includes an isolation valve, generally designated 312.

In the subject embodiment, the isolation valve 312 is a two-position, four-way valve having a first position $P_1$ and a second position $P_2$. In the first position $P_1$, the isolation valve 312 enables the load-reaction feature 306 of the hydrostatic steering circuit 20 by allowing fluid to flow through a fluid pathway 314 from the fluid actuator 22 to the fluid controller 60. In the second position $P_2$, the isolation valve 312 disables the load-reaction feature 306 of the hydrostatic steering circuit 20 by blocking the flow of fluid between the fluid actuator 22 and the fluid controller 60.

In the subject embodiment, fluid from the load-sensing feature 308 of the second proportional valve 304 is communicated through a passageway 316 to a first end 318 of the isolation valve 312 when the second proportional valve 304 is actuated to one of the right and left turn positions $R_3$, $L_3$. The fluid communicated to the first end 318 actuates the isolation valve 312 to the first position $P_1$. As the load-sense feature 308 of the second proportional valve 304 provides fluid communication between the pump 16 and the first end 318 of the isolation valve 312 when the second proportional valve 304 is actuated to one of the right and left turn positions $R_3$, $L_3$, a shuttle valve having a first and second inlet in fluid communication with the first and second control ports 66, 68 and a fluid outlet in fluid communication with the first end 318 of the isolation valve 312 is not needed.

In the subject embodiment, the sensor 82 is in communication with the passageway 312 between the second proportional valve 304 and the isolation valve 202. As the sensor 82 is in electrical communication with the microcontroller 36 of the electro-hydraulic steering circuit 18, when the steering actuation member S of the hydrostatic steering circuit 20 is actuated, the sensor 82 detects fluid in the passageway 312 and electrically communicates a signal to the microcontroller 36 of the electro-hydraulic steering circuit 18 that indicates the steering actuation member S is being actuated.

Figure 7:
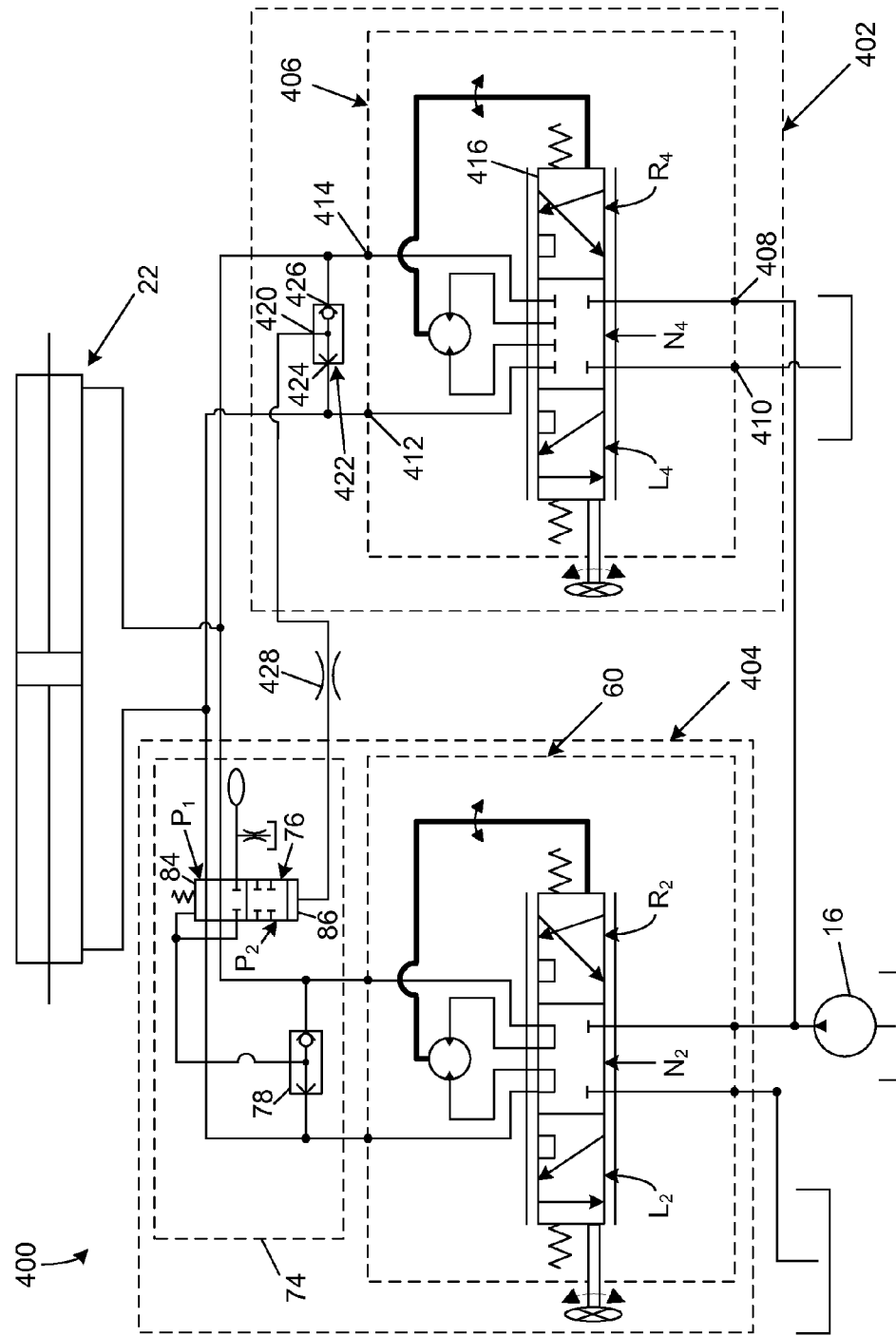
FIG. 7 is a hydraulic schematic of an alternate embodiment of a steering system.

Referring now to FIG. 7, an alternate embodiment of a steering circuit 400 is shown. In the subject embodiment, the steering circuit includes a first hydrostatic steering circuit 402 and a second hydrostatic steering circuit 404 disposed in a parallel flow configuration.

The first hydrostatic steering circuit 402 includes a first fluid controller 406 defining a fluid inlet 408, which is in fluid communication with the pump 16, a fluid outlet 410, which is in fluid communication with the reservoir 14, and first and second control ports 412, 414, which are in fluid communication with the fluid actuator 22.

The first fluid controller 406 includes a first proportional valve 416 that is disposed between the pump 16 and the fluid actuator 22. The first proportional valve 416 includes a neutral position $N_4$, a right turn position $R_4$, and a left turn position $L_4$.

The second hydrostatic steering circuit 404 includes the fluid controller 60, which is disposed between the pump 16 and the fluid actuator 22, and the isolation circuit 200, which is disposed in series with the fluid controller 60. The fluid controller 60 includes the load-reaction feature 73 as described above.

The isolation valve circuit 74 of the second hydrostatic steering circuit 404 includes the isolation valve 76 and the shuttle valve 78. The first end 84 of the isolation valve 76 is in fluid communication with the shuttle valve 78.

The second end 86 of the isolation valve 76 is in fluid communication with a fluid outlet 420 of a second shuttle valve 422 having a first and second inlet 424, 426 in fluid communication with the first and second control ports 412, 414 of the first fluid controller 406. When the second proportional valve 30 of the fluid controller 60 is disposed in the neutral position $N_2$ and the first proportional valve 416 is actuated to one of the right and left turn positions $R_4$, $L_4$, fluid is communicated from the fluid outlet 420 of the second shuttle valve 422 to the second end 86 of the isolation valve 76, which actuates the isolation valve 76 into the second position P₂. As has been described above, the actuation of the isolation valve 76 to the second position P₂ disables the load-reaction feature 73 of the fluid controller 60.

In the subject embodiment, a pressure reducing device 428, such as a flow orifice, is disposed between the fluid outlet 420 of the second shuttle valve 422 and the second end 86 of the isolation valve 76. As the pressure of the fluid communicated to the second end 86 of the isolation valve 76 is at a lower pressure than the pressure of the fluid communicated to the first end 84 of the isolation valve 76, the pressure reducing device 428 allows the second proportional valve 30 to override the actuation of the isolation valve 76 by the first proportional valve 416.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for enabling a load-reaction feature of a steering system, the method comprising:
    providing a first steering circuit in selective fluid communication with a fluid actuator;
    providing a second steering circuit in selective fluid communication with the fluid actuator, the second steering circuit being in parallel to the first steering circuit, wherein the second steering circuit includes a fluid meter and a proportional valve having a load-reaction feature;
    providing an isolation valve between the proportional valve of the second steering circuit and the fluid actuator, the isolation valve being actuatable between a first position and a second position, wherein the first position enables the load-reaction feature of the proportional valve wherein the load-reaction feature places the fluid actuator in fluid communication with opposite sides of the fluid meter and the second position disables the load-reaction feature wherein the fluid meter is isolated from the fluid actuator, the isolation valve being piloted by an outlet of a shuttle valve disposed in the second steering circuit, the shuttle valve having a first inlet and second inlet in fluid communication with the proportional valve; and
    piloting the isolation valve to the first position with fluid communicated from the second steering circuit.

2. A method for enabling a load-reaction feature of a steering system, the method comprising:
    providing a first steering circuit in selective fluid communication with a fluid actuator;
    providing a second steering circuit in selective fluid communication with the fluid actuator, the second steering circuit being in parallel to the first steering circuit, wherein the second steering circuit includes a fluid meter and a proportional valve having a load-reaction feature and a load-sensing feature, the proportional valve being movable between a left turn position and a right turn position;
    providing an isolation valve between the proportional valve of the second steering circuit and the fluid actuator, the isolation valve being actuatable between a first position and a second position, wherein the first position enables the load-reaction feature of the proportional valve wherein the load-reaction feature places the fluid actuator in fluid communication with opposite sides of the fluid meter and the second position disables the load-reaction feature wherein the fluid meter is isolated from the fluid actuator;
    piloting the isolation valve to the first position with fluid communicated from the load-sensing feature when the proportional valve is moved to the left turn position or the right turn position.

3. The method for enabling the load-reaction feature of the steering system of claim 2, wherein the step of providing a second steering circuit including a proportional valve further comprises providing a steering actuation member configured for moving the proportional valve between the left turn position and the right turn position.

4. The method for enabling the load-reaction feature of the steering system of claim 2, wherein the step of providing a second steering circuit further comprises providing a fluid pathway between the load-sensing feature of the proportional valve and a first end of the isolation valve.

5. A method for enabling a load-reaction feature of a steering system, the method comprising:
    providing a first steering circuit in selective fluid communication with a fluid actuator;
    providing a second steering circuit in selective fluid communication with the fluid actuator, the second steering circuit being in parallel to the first steering circuit, wherein the second steering circuit includes a fluid meter and a proportional valve having a load-reaction feature and a load-sensing feature, the proportional valve being movable between a left turn position and a right turn position;
    providing an isolation valve between the proportional valve of the second steering circuit and the fluid actuator, the isolation valve being actuatable between a first position and a second position, wherein the first position enables the load-reaction feature of the proportional valve wherein the load-reaction feature places the fluid actuator in fluid communication with opposite sides of the fluid meter and the second position disables the load-reaction feature wherein the fluid meter is isolated from the fluid actuator;
    providing a fluid pathway between the load-sensing feature of the proportional valve and a first end of the isolation valve;
    providing a fluid sensor in the fluid pathway for detecting movement of the steering actuation member; and
    piloting the isolation valve to the first position with fluid communicated from the load-sensing feature when the proportional valve is moved to the left turn position or the right turn position.

* * * * *